United States Patent
Salter et al.

(10) Patent No.: US 11,524,629 B2
(45) Date of Patent: Dec. 13, 2022

(54) AUDIBLE NAVIGATION INDICATOR

(71) Applicant: Ford Global Technologies, LLC, Dearborn, MI (US)

(72) Inventors: Stuart C. Salter, White Lake, MI (US); Joshua Wheeler, Trenton, MI (US); Paul Kenneth Dellock, Northville, MI (US); David Brian Glickman, Southfield, MI (US); Kristopher Karl Brown, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 498 days.

(21) Appl. No.: 16/658,598

(22) Filed: Oct. 21, 2019

(65) Prior Publication Data
US 2021/0114518 A1   Apr. 22, 2021

(51) Int. Cl.
| | |
|---|---|
| *B60Q 5/00* | (2006.01) |
| *G08G 1/0962* | (2006.01) |
| *G10L 25/51* | (2013.01) |
| *B60R 11/00* | (2006.01) |
| *B60R 11/02* | (2006.01) |

(52) U.S. Cl.
CPC ......... *B60Q 5/005* (2013.01); *G08G 1/09626* (2013.01); *G10L 25/51* (2013.01); *B60R 11/0217* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 4,831,357 | A | 5/1989 | Miller |
| 5,140,304 | A | 8/1992 | Miller |
| 6,154,125 | A | 11/2000 | McAuley et al. |
| 8,537,030 | B2 | 9/2013 | Perkins |
| 8,751,106 | B2 | 6/2014 | Raz et al. |
| 8,854,229 | B2 | 10/2014 | Kim et al. |
| 8,963,705 | B2 | 2/2015 | Miller et al. |
| 10,160,378 | B2 | 12/2018 | Sweeney et al. |
| 10,222,773 | B2 | 3/2019 | Funk et al. |
| 10,303,257 | B2 | 5/2019 | Hillis et al. |

(Continued)

FOREIGN PATENT DOCUMENTS

| | | | | |
|---|---|---|---|---|
| CN | 108888424 A | * | 11/2018 | ............ A61G 5/042 |
| CN | 208149166 U | * | 11/2018 | |

*Primary Examiner* — Fekadeselassie Girma
(74) *Attorney, Agent, or Firm* — Frank A. MacKenzie; Bejin Bieneman PLC (57) ABSTRACT

A vehicle includes a first sound generator supported at a front of the vehicle and positioned to generate sound in a vehicle-forward direction. The vehicle includes a second sound generator supported at a right side of the vehicle and positioned to generate sound in a vehicle-right direction. The vehicle includes a third sound generator supported at a left side of the vehicle and positioned to generate sound in a vehicle-left direction. The vehicle includes a computer in communication with the first, second, and third sound generators, the computer having a processor and a memory storing instructions executable by the processor to identify an anticipated maneuver of the vehicle as a right-turn maneuver or a left-turn maneuver, actuate the first sound generator, and then, selectively actuate the second sound generator or the third generator based on the anticipated maneuver.

15 Claims, 4 Drawing Sheets

(56) References Cited

U.S. PATENT DOCUMENTS

| | | | |
|---|---|---|---|
| 10,315,563 B1* | 6/2019 | Harper | B60Q 5/006 |
| 10,414,336 B1* | 9/2019 | Harper | B60Q 5/008 |
| 2003/0227376 A1 | 12/2003 | Yamaki et al. | |
| 2013/0154820 A1 | 6/2013 | Miller et al. | |
| 2016/0167648 A1 | 6/2016 | James et al. | |
| 2018/0132285 A1 | 5/2018 | Jackson et al. | |
| 2019/0001881 A1* | 1/2019 | You | B60Q 5/006 |
| 2021/0114518 A1* | 4/2021 | Salter | G10L 25/51 |
| 2022/0111871 A1* | 4/2022 | Schmitt | G08G 1/166 |

* cited by examiner

AUDIBLE NAVIGATION INDICATOR

BACKGROUND

A vehicle includes indicators for informing pedestrians and operators of other vehicles of an anticipated maneuver. For example, the vehicle includes right and left turn signals at a front and a rear of the vehicle that repetitively flash to inform pedestrians and operators of other vehicles that the vehicle will execute a right turn of a left turn.

DETAILED DESCRIPTION

A vehicle includes a first sound generator supported at a front of the vehicle and positioned to generate sound in a vehicle-forward direction. The vehicle includes a second sound generator supported at a right side of the vehicle and positioned to generate sound in a vehicle-right direction. The vehicle includes a third sound generator supported at a left side of the vehicle and positioned to generate sound in a vehicle-left direction. The vehicle includes a computer in communication with the first, second, and third sound generators, the computer having a processor and a memory storing instructions executable by the processor to identify an anticipated maneuver of the vehicle as a right-turn maneuver or a left-turn maneuver, actuate the first sound generator, and then, selectively actuate the second sound generator or the third generator based on the anticipated maneuver.

The instructions may further include instructions to actuate the first sound generator to generate sound at a first level, and then, actuate the first sound generator to generate sound at a second level that is lower than the first level and selectively actuate the second sound generator or the third generator based on the anticipated maneuver and to generate sound at a third level that is greater than the second level.

The vehicle may include a fourth sound generator supported at a rear of the vehicle and positioned to generate sound in a vehicle-rearward direction, the fourth sound generator in communication with the computer.

The instructions may further include instructions to further identify the anticipated maneuver as a forward maneuver or a reverse maneuver, selectively actuate the first sound generator or the fourth sound generator based on the anticipated maneuver, and, then selectively actuate the second sound generator or the third sound generator based on the anticipated maneuver.

The second sound generator may include a transducer fixed to one of a rear quarter panel or a door panel.

The fourth sound generator may include a transducer fixed to one of a rear facia or a rear deck panel.

The first sound generator may include a transducer fixed to a front facia of the vehicle.

The second sound generator may include a transducer fixed to one of a front quarter panel or a door panel.

The instructions may further include instructions to actuate one or more of the first, second, and third sound generators to generate sound in either an ascending scale or a descending scale based on whether the anticipated maneuver is in a forward or reverse direction.

The instructions may further include instructions to identify the anticipated maneuver based on actuation of a turn signal of the vehicle.

The instructions may further include instructions to identify the anticipated maneuver based on data from a navigation system of the vehicle.

The instructions may further include instructions to identify the anticipated maneuver based on a steering angle the vehicle.

The instructions may further include instructions to identify an external ambient noise level, and to actuate the first, second, or third sound generator based on the external ambient noise level.

The instructions may further include instructions to actuate the first, second, or third sound generator to generate sound at a sound level at a threshold amount greater than the external ambient noise level.

The instructions may further include instructions to identify a first external ambient noise level at the right side of the vehicle and a second external ambient noise level at the left side of the vehicle, and to actuate the first, second, or third sound generator based on the first and second external ambient noise levels.

A vehicle includes means for generating sound in a vehicle-forward direction and subsequently generating sound in one of a vehicle-right direction or a vehicle-left direction based on an anticipated maneuver of the vehicle that is a right-turn maneuver or a left-turn maneuver.

The vehicle may include means for identifying an external ambient noise level, and wherein the means for generating sound generates sounds based on the external ambient noise level.

The vehicle may include means for identifying a first external ambient noise level at the right side of the vehicle and a second external ambient noise level at the left side of the vehicle, and wherein the means for generating sound generates sounds based on the first and second external ambient noise levels The vehicle may include means generating sound in a vehicle-rearward direction based on an anticipated maneuver based on whether the anticipated maneuver is in a forward or reverse direction.

The vehicle may include means for generating sound generates either an ascending scale or a descending scale based on whether the anticipated maneuver is in a forward or reverse direction.

With reference to FIGS. 1-4, wherein like numerals indicate like parts throughout the several views, a vehicle 20 includes a first sound generator 22a supported at a front 24 of the vehicle 20 and positioned to generate sound in a vehicle-forward direction D1. The vehicle 20 includes a second sound generator 22b supported at a right side 26 of the vehicle 20 and positioned to generate sound in a vehicle-right direction D2. The vehicle 20 includes a third sound generator 22c supported at a left side 28 of the vehicle 20 and positioned to generate sound in a vehicle-left direction D3. The vehicle 20 may include a fourth sound generator 22d supported at rear 46 of the vehicle 20 and positioned to generate sound in a vehicle-rearward direction D4. The vehicle 20 includes a computer 30 in communication with the sound generators 22a, 22b, 22c, 22d. The computer 30 has a processor and a memory storing instructions executable by the processor to identify an anticipated maneuver of the vehicle 20 as a right-turn maneuver or a left-turn maneuver. The instructions include instructions to actuate the first sound generator 22a, and then, selectively actuate the second sound generator 22b or the third sound generator 22c based on the anticipated maneuver.

Actuating the sound generators 22a, 22b, 22c, 22d based on the anticipated maneuver provides an audible indication that the vehicle 20 is anticipated to execute the anticipated maneuver. For example, actuating the sound generators 22a, 22b, 22c, 22d based on the anticipated maneuver may inform a pedestrian that the vehicle 20 is anticipated to execute a right-turn even if the pedestrian does not view turns signals of the vehicle 20.

The vehicle 20 may be any type of passenger or commercial automobile such as a car, a truck, a sport utility vehicle, a crossover vehicle, a van, a minivan, a taxi, a bus, etc. In this description, relative orientations and direction are from the perspective of an occupant seated in a driver seat, facing a dashboard of a vehicle 20.

The vehicle 20 may operate in an autonomous mode, a semiautonomous mode, or a nonautonomous mode. For purposes of this disclosure, an autonomous mode is defined as one in which each of a propulsion system, a braking system, and a steering system of the vehicle 20 are controlled by the computer 30; in a semiautonomous mode the computer 30 controls one or two of the propulsion system, the braking system, and the steering system; in a nonautonomous mode, a human operator controls the propulsion system, the braking system, and the steering system.

The vehicle 20 may be of a unibody construction. In the unibody construction, a body of the vehicle 20, e.g., rockers, serves as the vehicle frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

Figure 1:
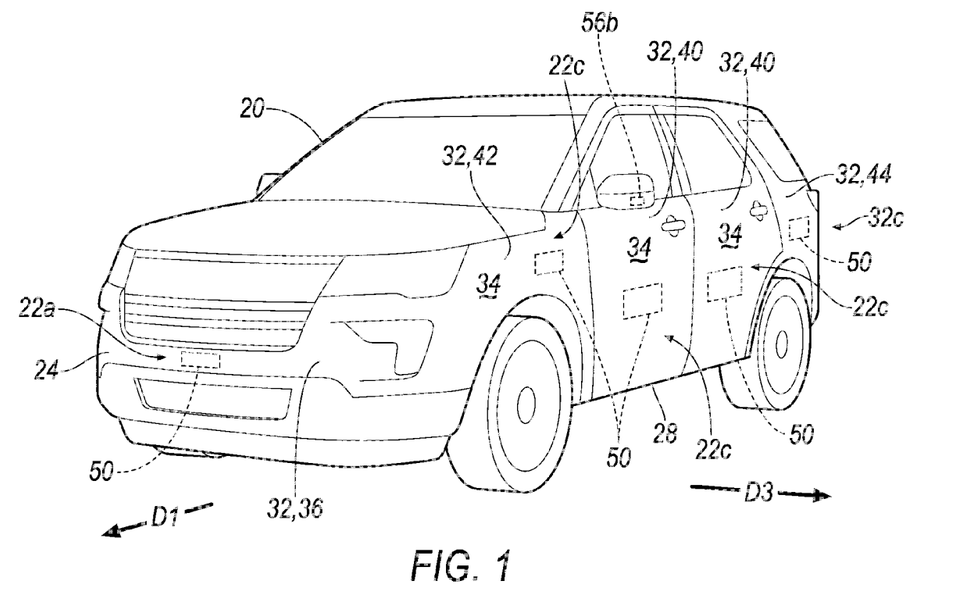
FIG. 1 is a front right perspective view of a vehicle.
Figure 2:
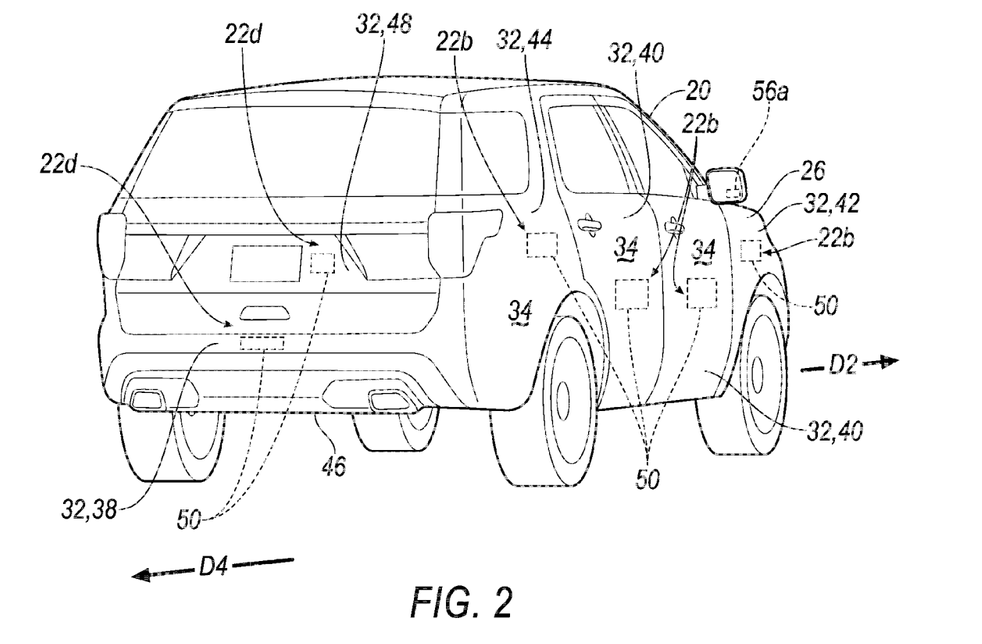
FIG. 2 is a real left perspective view of the vehicle.

The vehicle 20 includes body panels 32. The body panels 32 surround a passenger cabin and other compartments of the vehicle 20. The body panels 32 provide external surfaces 34 of the vehicle 20. The external surfaces 34 may be class-A surfaces, i.e., surfaces specifically manufactured to have a high quality, finished aesthetic appearance free of blemishes. The body panels 32 may include a front facia 36 and a rear facia 38, e.g., covering a front and rear bumper of the vehicle 20, respectively. The body panels 32 may include door panels 40 supported by doors of the vehicle 20. The body panels 32 may include front quarter panels 42 supported proximate the front 24 of the vehicle 20 at the right side 26 and the left side 28, e.g., between the doors and the front bumper. The body panels 32 may include rear quarter panels 44 supported proximate the rear 46 of the vehicle 20 at the right side 26 and the left side 28, e.g., between the doors and the rear bumper. The body panels 32 may include a rear deck panel 48, e.g., supported by a trunk lid, hatchback, tailgate, liftgate, or other structure that opens and closes at the rear 46 to provide access to a compartment of the vehicle 20. Example compartments include a trunk, a bed, and the passenger cabin of the vehicle 20.

Figure 3:
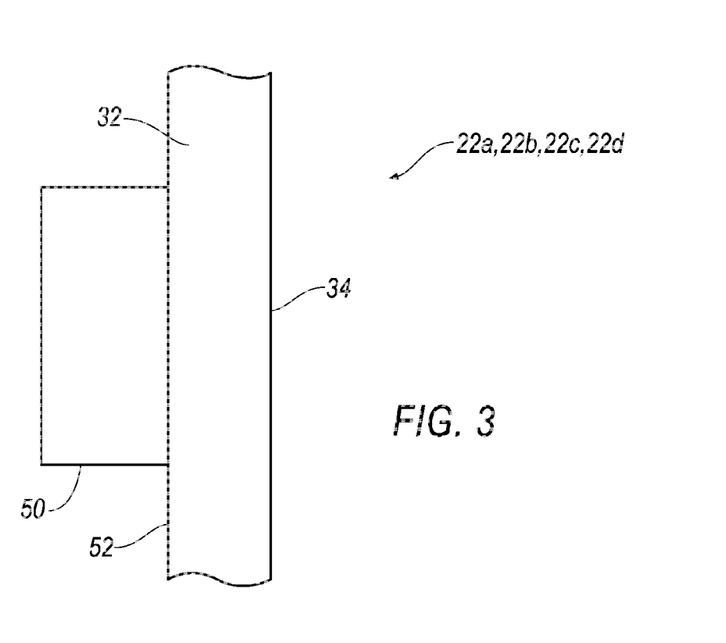
FIG. 3 is a cross-section of a body panel of the vehicle.

The sound generators 22a, 22b, 22c, 22d generate sound, e.g., in response to a command from the computer 30. The sound generators 22a, 22b, 22c, 22d may include a magnet, an induction coil (sometimes referred to as a voice coil), and/or other suitable structure for generating sound. The sound generators 22a, 22b, 22c, 22d are supported at various locations of the vehicle 20. As one example, the sound generators 22a, 22b, 22c, 22d may include cone speakers that convert electrical energy to sound via a cone. A voice coil of the speaker generates a magnetic field, e.g., in response a command from the computer, that vibrates the cone. Vibration of the cone may generate sound. The speakers may be fixed to the body and/or the body panels 32, or other structure of the vehicle 20. As another example, the sound generators 22a, 22b, 22c, 22d may include transducers 50 (sometimes referred to as coneless speakers). Transducers convert electrical energy into mechanical vibration. Transducers include a core, e.g., a magnet. A voice coil of the transducer 50 generates a magnetic field, e.g., in response a command from the computer 30, that vibrates the core. Vibration of the core may be mechanically transmitted to a structure supporting transducer 50. Vibration of such structure may generate sound. The transducers 50 may be fixed to the body panels 32, e.g., via fastener or the like. The transducers 50 may be fixed to in an inside surface 52 of the body panel 32, e.g., opposite the external surface 34, as illustrated in FIG. 3. Actuation of one of the transducers 50 generates sound by vibrating the body panel 32 to which it is fixed. Vibration of the body panel 32 generates sound in a direction that is normal to the body panel 32 proximate the transducer 50 fixed thereto.

The sound generators 22a, 22b, 22c, 22d may selectively generate sounds at different pitches, i.e., acoustic frequencies, e.g., measured in Hertz. For example, the transducer 50 may actuate and vibrate the body panel 32 to which it is fixed at a specified frequency, e.g., in response to a command from the computer 30 specifying the frequency. The sound generators 22a, 22b, 22c, 22d may selectively generate sounds at different sound levels, i.e., loudness levels, e.g., measured in decibels. For example, the transducer 50 may actuate and vibrate the body panel 32 to which it is fixed at a specified amplitude, e.g., in response to a command from the computer 30 specifying the amplitude.

The sound generators 22a, 22b, 22c, 22d are positioned to generate sound in specific directions relative to the vehicle 20. With reference to FIG. 1, one or more sound generators 22a may be supported at the front 24 of the vehicle 20 and positioned to generate sound in the vehicle-forward direction D1. For example, a cone speaker may be supported by the front facia 36. A cone of the speaker at the front facia 36 may be oriented to direct generated sound in the vehicle-forward direction D1. As another example, one or more coneless speakers, i.e., transducers 50 may be fixed to the front facia 36 of the vehicle 20. One or more sound generators 22c may be supported at the left side 28 of the vehicle 20 and positioned to generate sound in the vehicle-left direction D3. For example, speakers may be supported by the front quarter panel 42, the door panel 40, or the rear quarter panel 44 on the left side 28 of the vehicle 20. A cone of the speaker(s) at the left side 28 may be oriented to direct generated sound in the vehicle-left direction D3. As another example, one or more may be transducers 50 fixed to the front quarter panel 42, the door panel 40 and/or the rear quarter panel 44 at the left side 28 of the vehicle 20. With reference to FIG. 2, one or more sound generators 22b may be supported at the right side 26 of the vehicle 20 and positioned to generate sound in the vehicle-right direction D2. For example, speakers may be supported by the front quarter panel 42, the door panel 40, or the rear quarter panel 44 on the right side 26 of the vehicle 20. A cone of the speaker(s) at the right side 26 may be oriented to direct generated sound in the vehicle-right direction D2. As another example, one or more may be transducers 50 fixed to the front quarter panel 42, the door panel 40 and/or the rear quarter panel 44 at the right side 26 of the vehicle 20 One or more sound generators 22*d* may be supported at the rear 46 of the vehicle 20 and positioned to generate sound in the vehicle-rearward direction D4. For example, a speaker may be supported by the rear facia 38. A cone of the speaker at the front facia 36 may be oriented to direct generated sound in the vehicle-rearward direction D4. As another example, one or more transducers 50 may be fixed to the rear facia 38 and/or the rear deck panel 48.

Figure 4:
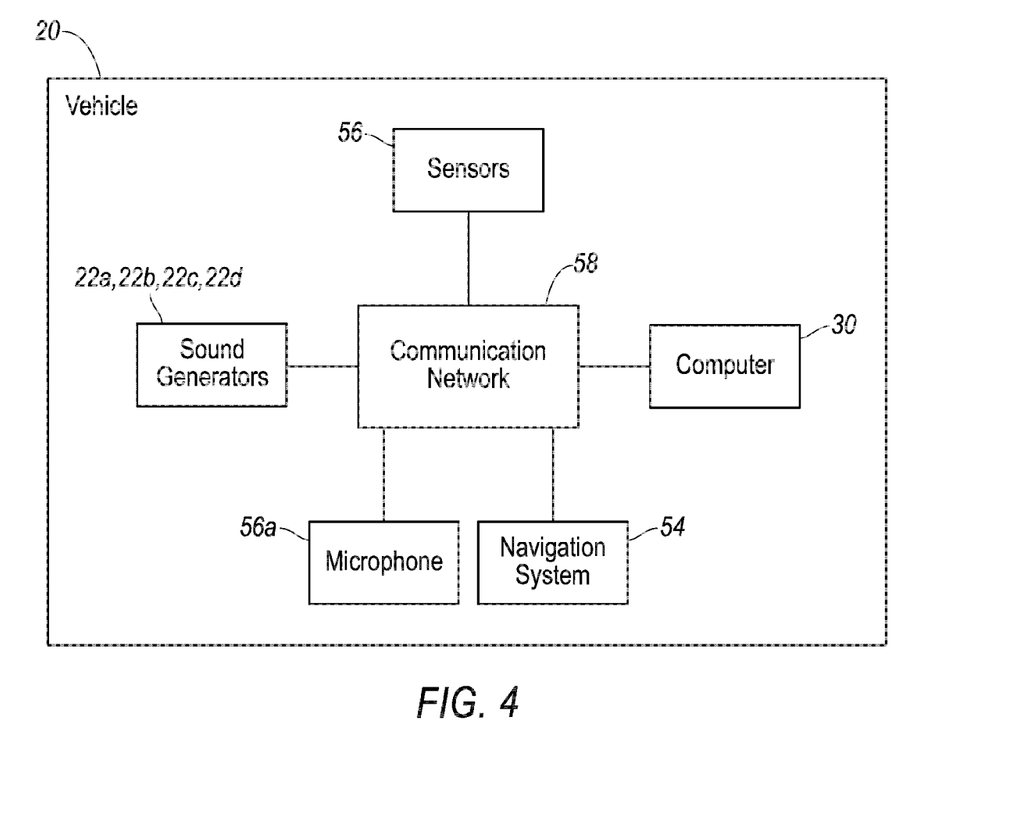
FIG. 4 is a block diagram of components of the vehicle.

With reference to FIG. 4, the vehicle 20 may include a navigation system 54. The navigation system 54 is implemented via circuits, chips, or other electronic components that can determine a present location of the vehicle 20. The navigation system 54 may be implemented via satellite-based system such as the Global Positioning System (GPS). The navigation system 54 may triangulate the location of the vehicle based on signals received from various satellites in the Earth's orbit. The navigation system 54 is programmed to output signals representing the present location of the vehicle 20 to, e.g., the computer 30 via a communication network 58. In some instances, the navigation system 54 is programmed to determine a route from the present location to a future location. The navigation system 54 may access a virtual map stored in memory and develop the route according to the virtual map data. The virtual map may include data specifying lanes of roads of the virtual map, e.g., including turn lanes, a direction of traffic flow for the lanes, etc.

The vehicle 20 includes sensors 56. The sensors 56 may detect internal states of the vehicle 20, for example, wheel speed, steering angle, turn signal actuation, and engine and transmission variables. The sensors 56 may detect the position or orientation of the vehicle 20, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 56 may detect the external world, for example, microphones 56*a*, 56*b*, radar sensors, scanning laser range finders, light detection and ranging (LIDAR) devices, and image processing sensors such as cameras. The sensors 56 may include communications devices, for example, vehicle-to-infrastructure (V2I) or vehicle-to-vehicle (V2V) devices.

The communication network 58 includes hardware, such as a communication bus, for facilitating communication among vehicle components. The communication network 58 may facilitate wired or wireless communication among the vehicle components, e.g., the computer 30, the sound generators 22*a*, 22*b*, 22*c*, 22*d*, the sensors 56, the navigation system 54, etc., in accordance with a number of communication protocols such as controller area network (CAN), Ethernet, WiFi, Local Interconnect Network (LIN), and/or other wired or wireless mechanisms.

The computer 30, implemented via circuits, chips, or other electronic components, is included in the vehicle 20 for carrying out various operations, including as described herein. The computer 30 is a computing device that generally includes a processor and a memory, the memory including one or more forms of computer-readable media, and storing instructions executable by the processor for performing various operations, including as disclosed herein. The memory of the computer 30 further generally stores remote data received via various communications mechanisms; e.g., the computer 30 is generally configured for communications on a controller area network (CAN) bus or the like, and/or for using other wired or wireless protocols, e.g., Bluetooth, etc. The computer 30 may also have a connection to an onboard diagnostics connector (OBD-II). Via the communication network 58 using Ethernet, WiFi, the CAN bus, Local Interconnect Network (LIN), and/or other wired or wireless mechanisms, the computer 30 may transmit messages to various devices in the vehicle 20 and/or receive messages from the various devices, e.g., the sensors 56, the sound generators 22*a*, 22*b*, 22*c*, 22*d*, the navigation system 54, etc. For example, the computer 30 may receive data from the sensors 56 and the navigation system 54 and send commands to the sound generators 22*a*, 22*b*, 22*c*, 22*d*. Although one computer 30 is shown in FIG. 4 for ease of illustration, it is to be understood that the computer 30 could include, and various operations described herein could be carried out by, one or more computing devices.

The computer 30 is programmed to, i.e., the memory stores instructions executable by the processor to, identify an anticipated maneuver of the vehicle 20 as a right-turn maneuver or a left-turn maneuver, and may further identify the anticipated maneuver as a forward maneuver or a reverse maneuver. The anticipated maneuver is a maneuver the vehicle 20 is anticipated to make within a threshold amount of time, e.g., 2 minutes. For example, a vehicle 20 stopped at an intersection may be anticipated to turn right at the intersection, e.g., once traffic clears, once a stop light turns green, etc.

The computer 30 may identify the anticipated maneuver based on actuation of a turn signal of the vehicle 20. For example, the computer 30 may receive data from the sensors 56 specifying actuation of the turn sign to indicate a right turn or a left turn. The computer 30 may identify the anticipated maneuver as the right-turn maneuver upon receiving data specifying actuation of the turn signal to indicate a right turn. The computer 30 may identify the anticipated maneuver as the left-turn maneuver upon receiving data specifying actuation of the turn signal to indicate a left turn.

The computer 30 may identify the anticipated maneuver based on a steering angle the vehicle 20. For example, the computer 30 may receive data from the sensors 56 specifying the steering angle of the vehicle 20 as being toward the right side 26 or the left side 28. The computer 30 may identify the anticipated maneuver as the right-turn maneuver upon receiving data specifying the steering angle is toward the right side 26. The computer 30 may identify the anticipated maneuver as the left-turn maneuver upon receiving data specifying the steering angle is toward the left side 28.

The computer 30 may identify the anticipated maneuver based on a selected drive gear of the vehicle 20. For example, the computer 30 may receive data from the sensors 56 specifying the vehicle 20 is in a forward-drive gear or a reverse-drive gear. The computer 30 may identify the anticipated maneuver as the forward maneuver upon receiving data specifying selection of the forward-drive gear. The computer 30 may identify the anticipated maneuver as the reverse maneuver upon receiving data specifying selection of the reverse-drive gear.

The computer 30 may identify the anticipated maneuver based on data from the navigation system 54 of the vehicle 20. Data from the navigation system 54 may specify the anticipated maneuver. For example, a route planned by the navigation system 54 may include a forward-right-turn maneuver, such as turning at an intersection. As another example, the route planned by the navigation system 54 may include a reverse-left-turn maneuver, such as backing out of a parking space.

The computer 30 may be programmed to identify an external ambient noise level. The external ambient noise level is a noise level, e.g., measured in decibels, of sound external the vehicle 20. The computer 30 may identify the external ambient noise level based on data from the sensors 56. For example, the computer 30 may receive data from a microphone 56a, 56b positioned to detected sound external the vehicle 20. The data may specify the measured decibels of the noise level of the detected sound. The computer 30 may identify a first external ambient noise level at the right side 26 of the vehicle 20 and a second external ambient noise level at the left side 28 of the vehicle 20. For example, the computer 30 may receive data specifying the measured decibels of the noise level at the right side 26 from a microphone 56a positioned to detected sound at the right side 26 of the vehicle 20, and may receive data specifying the measured decibels of the noise level at the left side 28 from a microphone 56b position to detected sound at the left side 28 of the vehicle 20.

The computer 30 is programmed to selectively actuate the sound generators 22a, 22b, 22c, 22d based on the anticipated maneuver. The computer 30 may selectively actuate one or more specified sound generators 22a, 22b, 22c, 22d by transmitting a command to the one or more specified sound generators 22a, 22b, 22c, 22d. The command may specify a sound level, e.g., in decibels. The command may specify a pitch, e.g., in Hertz.

The computer 30 may selectively actuate the sound generators 22a, 22b, 22c, 22d such that sound produced by the sound generators 22a, 22b, 22c, 22d mimics the anticipated maneuver. For example and with reference to FIG. 5, a curve C1 illustrates actuation of one or more sound generators 22a, 22b, 22c, 22d that generates sound in a current direction of the vehicle 20 at various sounds levels over time, and a curve C2 illustrates actuation of one or more sound generators 22b, 22c that generate sound in an anticipated direction of the vehicle 20 at various sounds levels over time.

Figure 5:
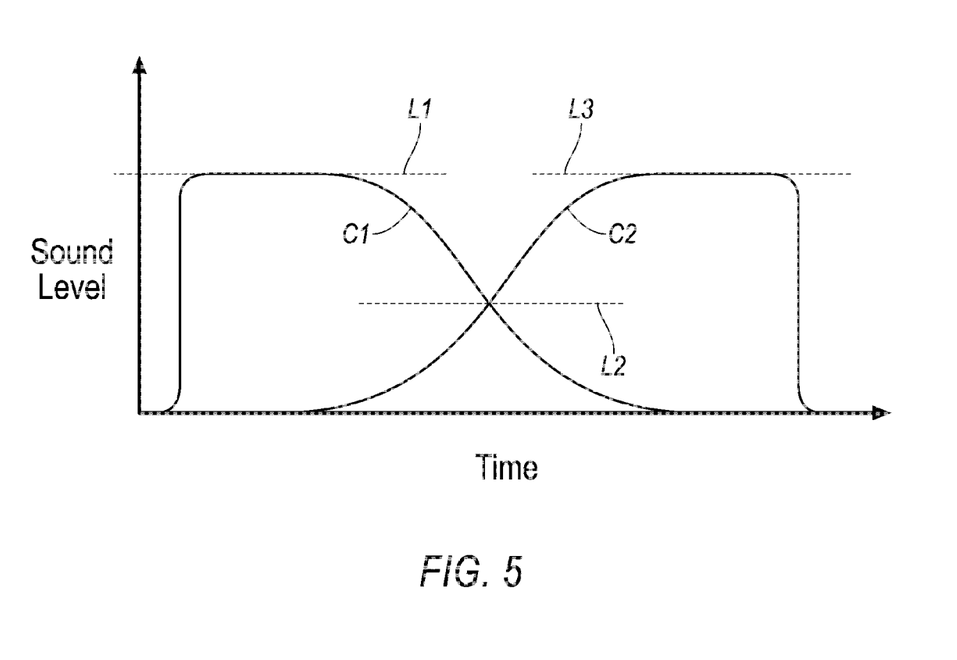
FIG. 5 is a graph illustrating sound intensity actuation levels for sound generators of the vehicle.

To mimic the anticipated maneuver, the computer 30 may first actuate one or more sound generators 22a, 22b, 22c, 22d that generates sound in a current direction of the vehicle 20 to generate sound at a first level L1. The current direction of the vehicle 20 is either the vehicle-forward direction D1 or the vehicle-rearward direction D4 depending on whether the vehicle 20 is in the forward-drive gear or the reverse-drive gear. In other words, the current direction of the vehicle 20 is the vehicle-forward direction D1 when the vehicle 20 is in the forward-drive gear and is the vehicle-rearward direction D4 when the vehicle 20 is in the reverse-drive gear.

Then, the computer 30 may actuate the one or more sound generators 22a, 22b, 22c, 22d that generate sound in the current direction of the vehicle 20 to generate sound at the second level L2 that is lower, i.e., less loud (e.g., a lower amount of decibels), than the first level L1 and selectively actuate one or more sound generators 22b, 22c that generate sound in the anticipated direction based on the anticipated maneuver to generate sound at a third level L3 that is greater than the second level L2. For example, the third level L3 may be the same loudness as the first level L1.

For example, when the anticipated maneuver is a forward-right-turn maneuver the computer 30 may first actuate the one or more sound generators 22a at the front 24 of the vehicle 20 to generate sound at the first level L1. Then, the computer 30 may actuate the one or more sound generators 22a at the front 24 of the vehicle 20 to generate sound at the second level L2 and actuate the one or more sound generators 22b at the right side 26 of the vehicle 20 to generate sound at the third level L3.

As another example, when the anticipated maneuver is a reverse-right-turn maneuver the computer 30 may first actuate the one or more sound generators 22d at the rear 46 of the vehicle 20 to generate sound at the first level L1. Then, the computer 30 may actuate the one or more sound generators 22d at the rear 46 of the vehicle 20 to generate sound at the second level L2 and actuate the one or more sound generators 22b at the right side 26 of the vehicle 20 to generate sound at the third level L3.

As yet another example, when the anticipated maneuver is a forward-left-turn maneuver the computer 30 may first actuate the one or more sound generators 22a at the front 24 of the vehicle 20 to generate sound at the first level L1. Then, the computer 30 may actuate the one or more sound generators 22a at the front 24 of the vehicle 20 to generate sound at the second level L2 and actuate the one or more sound generators 22c at the left side 28 of the vehicle 20 to generate sound at the third level L3.

As one more example, when the anticipated maneuver is a reverse-left-turn maneuver the computer 30 may first actuate the one or more sound generators 22d at the rear 46 of the vehicle 20 to generate sound at the first level L1. Then, the computer 30 may actuate the one or more sound generators 22d at the rear 46 of the vehicle 20 to generate sound at the second level L2 and actuate the one or more sound generators 22c at the left side 28 of the vehicle 20 to generate sound at the third level L3.

The timing between actuating one or more of the sound generators 22a, 22b, 22c, 22d to generate sound in the current direction at the first level L1, and then actuating such sound generators 22a, 22b, 22c, 22d to generate sound at the second level L2 and actuating one or more of the sound generators 22a, 22b, 22c, 22d to generate sound in the anticipated direction at the third level L3, may be such that at a person outside the vehicle 20 perceives the sounds at the sound levels L1, L2, L3, to be a generally continuous sound that moves relative to the vehicle 20 from one distinct position (e.g., forward of the vehicle 30) to another distinct position (e.g., to the right side or left side of the vehicle 20). For example, the computer 30 may actuate one or more of the sound generators 22a, 22b, 22c, 22d to generate sound at the first level L1 for approximately one second before reducing such sound generation to the second level L2. Concurrently, or substantially concurrently (e.g., within 0.5 seconds), with actuating one or more of the sound generators 22a, 22b, 22c, 22d to generate sound at the second level L2, the computer 30 may actuate one or more of the sound generators 22a, 22b, 22c, 22d to generate sound at the third level L3. The computer 30 may maintain actuation of the one or more of the sound generators 22a, 22b, 22c, 22d to generate sound at the third level L3 for a same amount of time as the timing between actuating one or more of the sound generators 22a, 22b, 22c, 22d at the first level L1 and the second level L2. The computer 30 may cease actuation of the sound generators 22a, 22b, 22c, 22d after such time has passed, i.e., such that no sound is generated. The computer 30 may wait a threshold amount of time, e.g., one second, before repeating actuation of the sound generators 22a, 22b, 22c, 22d to generate sound at the first level L1, the second level L2, and the third level L3. The threshold amount of time is typically established to be sufficient for a human outside the vehicle 20 to distinguish between a first cycle of actuations of the sound generators 22a, 22b, 22c, 22d at the first level L1, the second level L2, and the third level L3, and a subsequent cycle of actuations of the sound generators 22a, 22b, 22c, 22d at the first level L1, the second level L2, and the third level L3. In other words, the timing may be such that individual cycles of actuation the sound generators 22a, 22b, 22c, 22d at the first level L1, then the second level L2 and the third level L3 may be distinguished from each other. For example, the timing may be such that the person outside the vehicle 20 can distinguish the movement of the generated sound as being in a single direction (e.g., front to side), and not ambiguous (e.g., unmoving sound or sound that could be front to side or side to front). The timing may be empirically determined based on a person's perceptions outside the vehicle. The timing may be determined based on mathematical and/or computer aided modeling. The timing may be stored in memory of the computer.

The first sound level L1 may be predetermined based on empirical testing or the like that indicates a sufficient sound level that may be heard by a pedestrian within a threshold range, e.g., 30 feet, of the vehicle 20 and over typical ambient noise, e.g., other vehicle noise. For example, the first sound level L1 may be 70 decibels. The predetermined first sound level L1 may be stored in the memory of the computer 30. Additionally or alternately, the first sound level L1 may be determined by the computer 30 based on detected ambient noise, as described below. The second sound level L2 is sufficiently low enough than a person outside the vehicle 20 may distinguish between the loudness's of the first level L1 and the second level L2. For example, the second level L2 may be at least ten decibels lower than the first level L1.

The computer 30 may mix the sound levels between such sound generators 22a, 22b, 22c, 22d. For example, the computer 30 may progressively increase and/or decrease the sound level of the sound generators 22a, 22b, 22c, 22d, as shown in the curves C1, C2 in FIG. 5.

The computer 30 may actuate one or more of the sound generators 22a, 22b, 22c, 22d to generate sound in either an ascending scale or a descending scale based on whether the anticipated maneuver is in the forward or reverse direction. Sound in the ascending scale progressively increases in pitch. In other words, the computer 30 may command one or more of the sound generators 22a, 22b, 22c, 22d to generate sound that increases in acoustic frequency over time. For example, the computer 30 may transmit a command specifying actuation to generate sound at the first level L1, the second L2, and/or third level L3 and with sequential musical notes A-B-C-D (e.g., 440 Hz, 494 Hz, 523 Hz, and 587 Hz, respectively) when the anticipated maneuver is the forward maneuver. Sound in the descending scale progressively decreases in pitch. In other words, the computer 30 may command one or more of the sound generators 22a, 22b, 22c, 22d to generate sound that decreases in acoustic frequency over time. For example, the computer 30 may transmit a command specifying actuation to generate sound at the first level L1, the second L2, and/or third level L3 and with sequential musical notes D-C-B-A when the anticipated maneuver is the reverse maneuver.

The computer 30 may be programmed to actuate one or more of the sound generators 22a, 22b, 22c, 22d based on the external ambient noise level, i.e., such that sound generated by the sound generators 22a, 22b, 22c, 22d may be perceived, e.g., by a pedestrian, over the external ambient noise. For example, the first level L1 and the third level L3 may be a threshold amount (e.g., 10 decibels) greater than the external ambient noise level. The threshold level may be determined with empirical testing to identify how much greater the sound from the sound generators 22a, 22b, 22c, 22d should be to permit a pedestrian to hear to such sound over the ambient external noise.

The computer 30 may actuate one or more of the sound generators 22a, 22b, 22c, 22d based on the first and second external ambient noise levels. For example, the computer 30 may actuate one or more of the sound generators 22a, 22b, 22d at the front 24 or rear 46 of the vehicle 20 and the right side 26 of the vehicle 20 such that the first level L1 and/or third level L3 are the threshold amount higher than the first external ambient noise level at the right side 26 of the vehicle 20. As another example, the computer 30 may actuate the sound generators 22a, 22c, 22d at the front 24 or rear 46 of the vehicle 20 and the left side 28 of the vehicle 20 such that the first level L1 and/or third level L3 are the threshold amount higher than the second external ambient noise level at the left side 28 of the vehicle 20. As a final example, the computer 30 may actuate one or more of the sound generators 22a, 22b, 22c, 22d such that the first level L1 and third level L3 are the threshold amount higher than the greater of the first or second external ambient noise levels.

Figure 6:
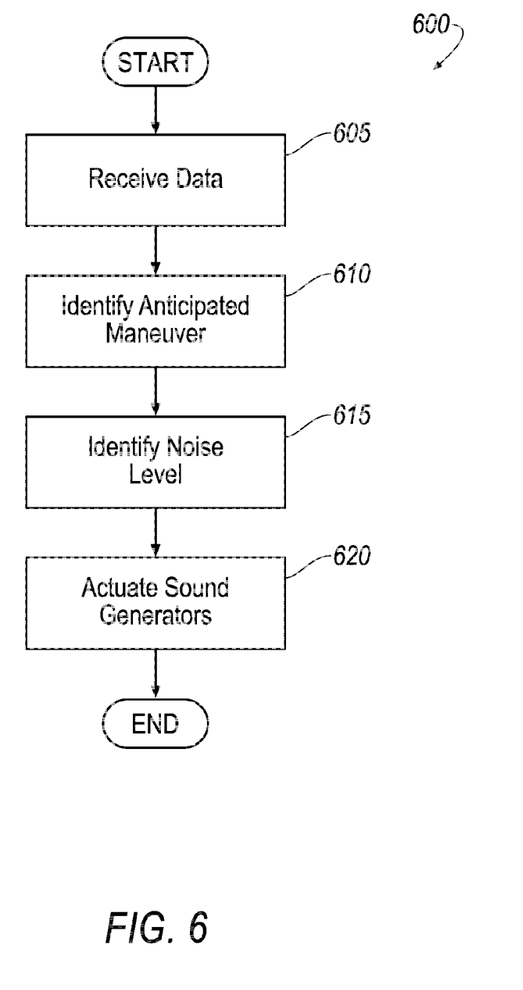
FIG. 6 is a flow chart for a process to control the vehicle.

FIG. 6 is a process flow diagram illustrating an exemplary process 600 for controlling the sound actuators of the vehicle 20. The process 600 begins in a block 605 where the computer 30 receives data, e.g., from the sensors 56 and the navigation system 54 via the communication network 58. The computer 30 may receive data substantially continuously or at intervals, e.g., every 100 milliseconds.

Next, at a block a 610, the computer 30 identifies an anticipated maneuver of the vehicle 20, e.g., based on data from the sensors 56 and/or the navigation system 54 and as described herein. For example, the computer 30 may identify the anticipated maneuver as one of the forward-left-turn maneuver, the forward-right-turn maneuver, the reverse-left-turn maneuver, or the reverse-right-turn maneuver.

Next, at a block 615, the computer 30 identifies one or more external ambient noise levels, e.g., based on data from the sensors 56 and as described herein. For example, the computer 30 may identify the sound level at the right side 26 of the vehicle based on data from the microphone 56a positioned to detected sound at the right side 26, and identify the sound level at the left side 28 of the vehicle based on data from the microphone 56b position to detected sound at the left side 28.

Next, at a block 620 the computer 30 actuates the sound generators 22a, 22b, 22c, 22d based on the anticipated maneuver identified in the block 610 and based on the external ambient noise level(s) identified at the block 615. For example, the computer 30 may first select one or more of the sound generators 22a, 22b, 22c, 22d as generating sound in a current direction of the vehicle 20, and one or more of the sound generators 22a, 22b, 22c, 22d as generating sound in an anticipated direction of the vehicle 20, e.g., based on the anticipated maneuver and as described herein. The computer may also select an ascending or descending pitch, e.g., based on the anticipated maneuver and as described herein. The computer 30 may also determine the first level L1, the second level L2, and the third level L3, e.g., such that the first level L1 and the third level L3 are a threshold amount (e.g., 10 decibels) greater than the external ambient noise level(s). The computer may command the selected sound generators 22a, 22b, 22c, 22d that generate sound in the current direction to generate sound at the first level, then the generate sound at the second level L2, and command the selected sound generators 22a, 22b, 22c, 22d that generate sound in the anticipated direction to generate sound at the third level L3. The command may specify the selected ascending or descending pitch. The computer 30 may repeatedly cycle actuation of the sound generators 22a, 22b, 22c, 22d at the first level L1, the second level L2, and the third level L3 until the vehicle 20 has completed the anticipated maneuver, e.g., such that a person outside the vehicle 20 can distinguish the movement of the generated sound as being in a single direction and as described herein. After the block 620 the process 600 may end. Alternately the process 600 may return to the block 605.

With regard to the process 600 described herein, it should be understood that, although the steps of such process 600 have been described as occurring according to a certain ordered sequence, such process 600 could be practiced with the described steps performed in an order other than the order described herein. It further should be understood that certain steps could be performed simultaneously, that other steps could be added, or that certain steps described herein could be omitted. In other words, the description of the process 600 herein is provided for the purpose of illustrating certain embodiments and should in no way be construed so as to limit the disclosed subject matter.

Computing devices, such as the computer 30, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a first sound generator supported at a front of the vehicle and positioned to generate sound in a vehicle-forward direction;
   a second sound generator supported at a right side of the vehicle and positioned to generate sound in a vehicle-right direction;
   a third sound generator supported at a left side of the vehicle and positioned to generate sound in a vehicle-left direction;
   a computer in communication with the first, second, and third sound generators, the computer having a processor and a memory storing instructions executable by the processor to:
   identify an anticipated maneuver of the vehicle as a right-turn maneuver or a left-turn maneuver;
   actuate the first sound generator; and
   then, selectively actuate the second sound generator or the third generator based on the anticipated maneuver,
   wherein the first, second, and third sound generators include a respective transducer mounted to an interior of a respective body panel of the vehicle and configured to generate sound by vibrating the body panel.

2. The vehicle of claim 1, wherein the instructions further include instructions to actuate the first sound generator to generate sound at a first level, and then, actuate the first sound generator to generate sound at a second level that is lower than the first level and selectively actuate the second sound generator or the third generator based on the anticipated maneuver and to generate sound at a third level that is greater than the second level.

3. The vehicle of claim 1, further comprising a fourth sound generator supported at a rear of the vehicle and positioned to generate sound in a vehicle-rearward direction, the fourth sound generator in communication with the computer.

4. The vehicle of claim 3, wherein the instructions further include instructions to further identify the anticipated maneuver as a forward maneuver or a reverse maneuver, selectively actuate the first sound generator or the fourth sound generator based on the anticipated maneuver, and, then selectively actuate the second sound generator or the third sound generator based on the anticipated maneuver.

5. The vehicle of claim 4, wherein the second sound generator includes a transducer fixed to one of a rear quarter panel or a door panel.

6. The vehicle of claim 3, wherein the fourth sound generator includes a transducer fixed to one of a rear facia or a rear deck panel.

7. The vehicle of claim 1, wherein the first sound generator includes a transducer fixed to a front facia of the vehicle.

8. The vehicle of claim 1, wherein the second sound generator includes a transducer fixed to one of a front quarter panel or a door panel.

9. The vehicle of claim 1, wherein the instructions further include instructions to actuate one or more of the first, second, and third sound generators to generate sound in either an ascending scale or a descending scale based on whether the anticipated maneuver is in a forward or reverse direction.

10. The vehicle of claim 1, wherein the instructions further include instructions to identify the anticipated maneuver based on actuation of a turn signal of the vehicle.

11. The vehicle of claim 1, wherein the instructions further include instructions to identify the anticipated maneuver based on data from a navigation system of the vehicle.

12. The vehicle of claim 1, wherein the instructions further include instructions to identify the anticipated maneuver based on a steering angle of the vehicle.

13. The vehicle of claim 1, wherein the instructions further include instructions to identify an external ambient noise level, and to actuate the first, second, or third sound generator based on the external ambient noise level.

14. The vehicle of claim 13, wherein the instructions further include instructions to actuate the first, second, or third sound generator to generate sound at a sound level at a threshold amount greater than the external ambient noise level.

15. The vehicle of claim 1, wherein the instructions further include instructions to identify a first external ambient noise level at the right side of the vehicle and a second external ambient noise level at the left side of the vehicle, and to actuate the first, second, or third sound generator based on the first and second external ambient noise levels.

* * * * *